Nov. 11, 1958  A. R. CRIPE  2,859,705
MOTOR TRAIN POWER UNIT, PASSAGEWAY AND CAB STRUCTURE
Filed April 30, 1956  4 Sheets-Sheet 1
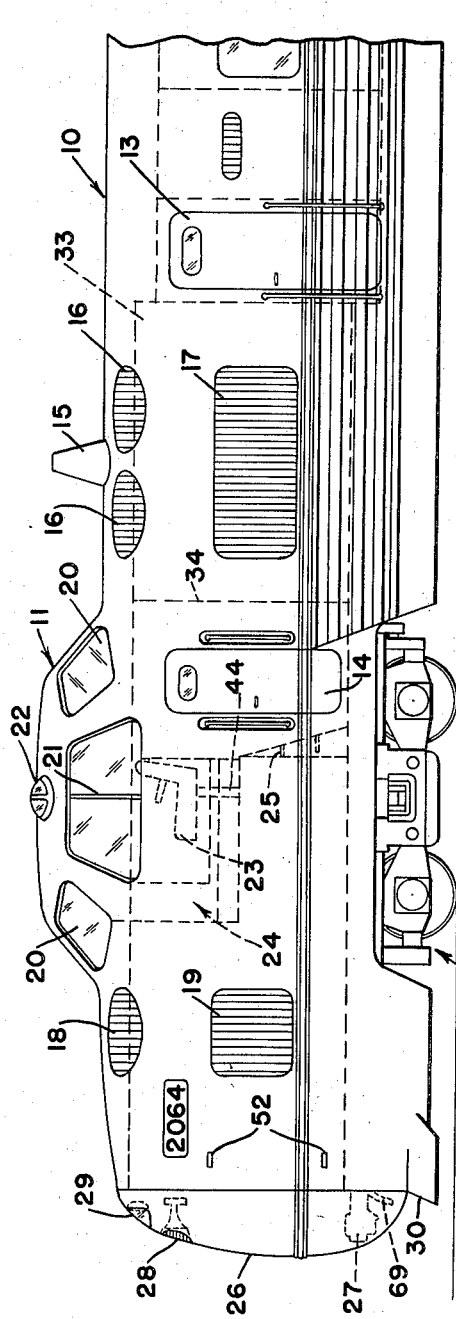
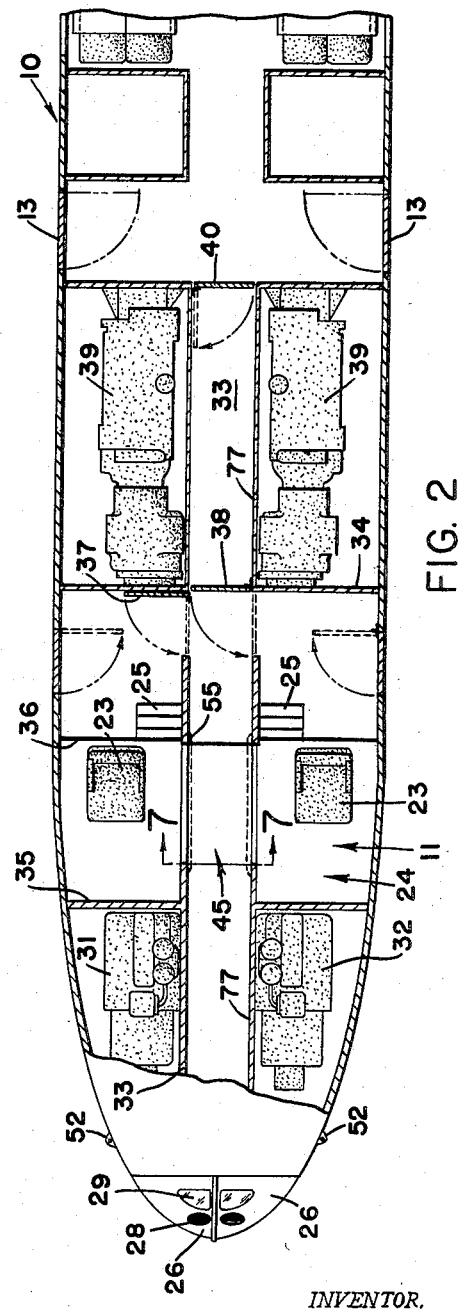
INVENTOR.
ALAN R. CRIPE
BY
*Fay & Fay*
ATTORNEYS Nov. 11, 1958  A. R. CRIPE  2,859,705
MOTOR TRAIN POWER UNIT, PASSAGEWAY AND CAB STRUCTURE
Filed April 30, 1956  4 Sheets-Sheet 2
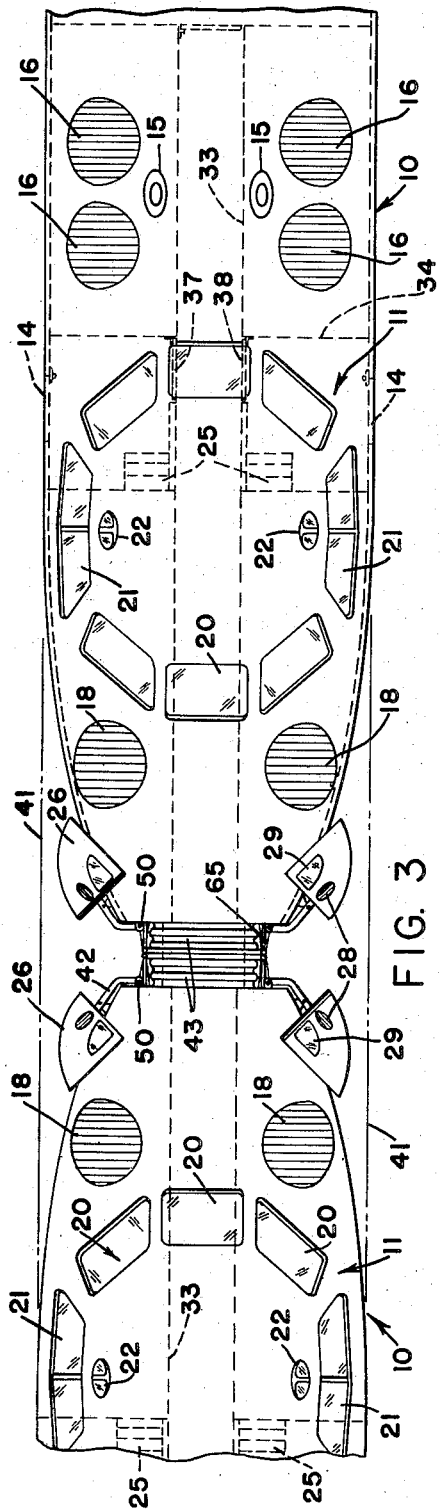
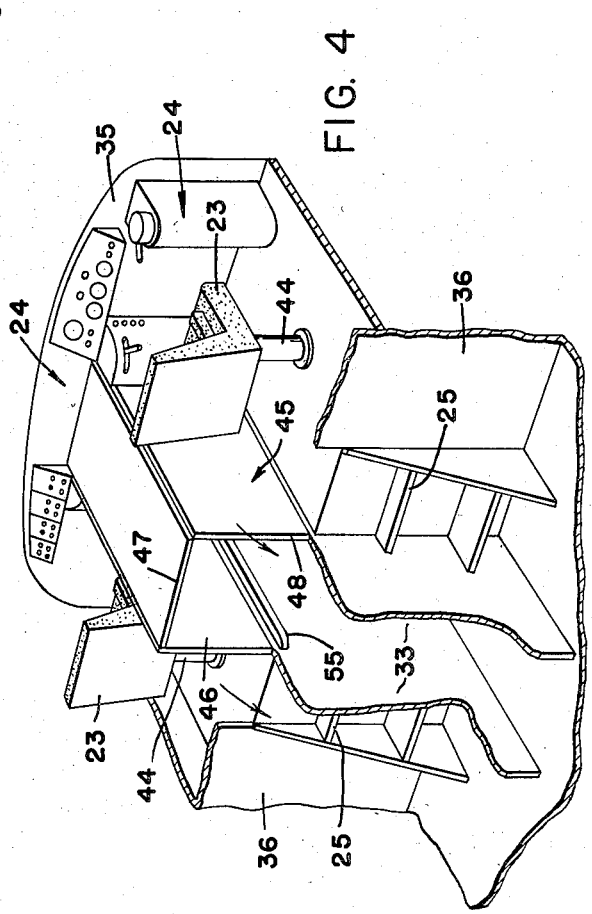
INVENTOR.
ALAN R. CRIPE
BY
Fay & Fay
ATTORNEYS Nov. 11, 1958      A. R. CRIPE      2,859,705
MOTOR TRAIN POWER UNIT, PASSAGEWAY AND CAB STRUCTURE
Filed April 30, 1956      4 Sheets-Sheet 3

INVENTOR.
ALAN R. CRIPE
BY
*Fay & Fay*
ATTORNEYS

Nov. 11, 1958 A. R. CRIPE 2,859,705
MOTOR TRAIN POWER UNIT, PASSAGEWAY AND CAB STRUCTURE
Filed April 30, 1956 4 Sheets-Sheet 4
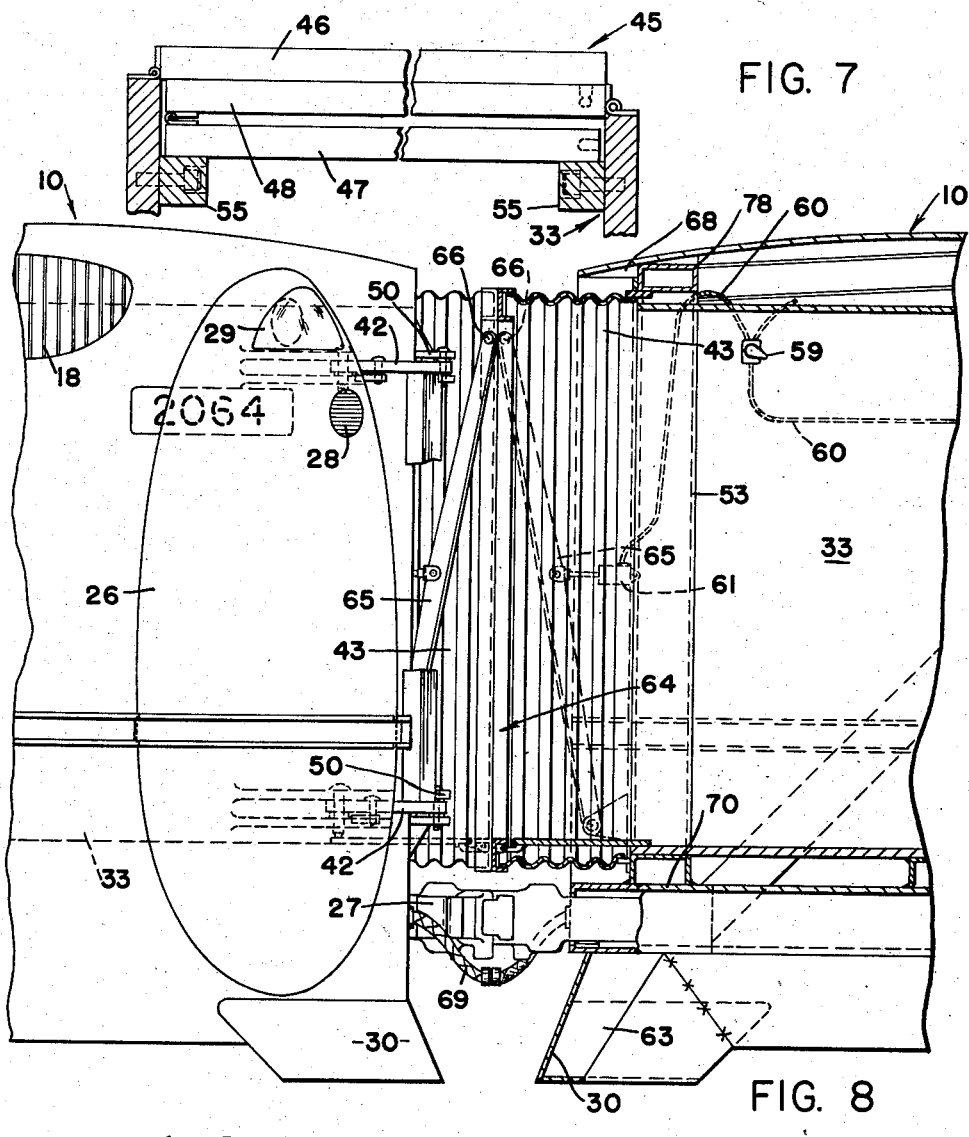
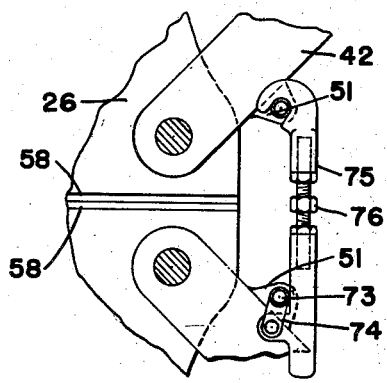
INVENTOR.
ALAN R. CRIPE
BY
*Fay & Fay*
ATTORNEYS

# United States Patent Office 2,859,705
Patented Nov. 11, 1958

2,859,705

MOTOR TRAIN POWER UNIT, PASSAGEWAY, AND CAB STRUCTURE

Alan R. Cripe, Chagrin Falls, Ohio, assignor to The Chesapeake and Ohio Railway Company, Cleveland, Ohio, a corporation of Virginia Application April 30, 1956, Serial No. 581,429

6 Claims. (Cl. 105—2)

This invention, relating as indicated to a motor train power unit, passageway and cab structure, is particularly directed to a novel type of streamlined power unit for double ended motor trains to permit easy coupling of the trains, whereby the motor trains may be run in multiple by means of combined operation from the leading motor train.

This invention further relates to a passageway through the streamlined power units incorporating a pair of clam shell doors and a retractable rubber diaphragm structure for connecting the motor trains.

The invention further relates to a cab structure in a motor train power unit which may be converted from a cab having an unobstructed flat floor in the cab which will not be intersected by the passageway. The passageway and cab are convertible so that a clear passageway for a normal height man of normal shoulder width may pass through the passageway when the motor train power units are coupled together, for combined operation.

In the general field of motor train units, streamlining is required for best efficiency and design, and in connection with streamlining it is important to have a simplified coupling connection to permit intercommunication between coupled trains. In general, proper streamlining of motor train power units provides difficulty in coupling because various types of retractable or drop couplings must be used to provide the proper streamlining. It is also difficult to provide a clear passageway through coupled trains.

This invention involves a motor train power unit having a fully streamlined appearance, with a pair of clam shell doors having a coupler within the confines of the clam shell doors, the clam shell doors being adapted to move outwardly and pivotally and being well within the area of skin drag and clearance requirements.

In general, it may be said that as motor trains of various types become developed, it is apparent that coupling operations may become necessary. It is easy to couple a plurality of trains together and operate them from a single cab, but it is more difficult to provide a passageway through the power units, particularly when the cab structures are streamlined. It is also difficult to keep the streamlining and provide a convenient passageway therethrough, and at the same time provide a combination cab and passageway. In general, the cab structure must have full vision, and preferably to the front, both sides and to the rear. In low height trains the passageway and cab structure conflict even if the associated diaphragm problem and coupling problem can be solved. This invention solves the problem by having a convertible passageway which may be pushed down when the motor trains are being operated singularly, and folded in the up position into the cab when the engineer and fireman would be only in the front cab, and the coupled motor train power units would not be operated from intermediate cabs. That is to say, the projection into the cab when no personnel would be using it would not reduce operating efficiency.

An object of this invention is to produce a new and improved power train motor unit having an unexposed coupler and a pair of clam shell doors with an associated rubber diaphragm for easy passage.

A further object of this invention is to produce a new and improved combination cab and passageway, the cab and passageway intersecting but having a convertible portion which may be folded up into the cab structure when a plurality of motor train units are operating in multiple.

A further object of this invention is to produce a new and improved connection between a number of streamlined motor trains, the means being a plurality of clam shell doors adapted to be pivoted outwardly and a special rubber diaphragm structure therefor.

A further object of this invention is to combine in a single double ended motor train a new and improved means for providing streamlining, a fixed coupler, a passageway, a pair of clam shell doors and a cab structure which will not hinder the utility of the passageway.

To the accomplishment of the foregoing and related ends, said invention, then, consists of the means hereinafter fully described and particularly pointed out in the claims; the following description setting forth in detail one approved method of carrying out the invention, such disclosed method, however, constituting but one of the various ways in which the principles of the invention may be used.

In the drawings:

Fig. 1 is a fragmentary side view of the motor train power unit;

Fig. 2 is a fragmentary top plan view of the motor train unit;

Fig. 3 is a fragmentary top plan view of two power units coupled together;

Fig. 4 is a fragmentary perspective view of the passageway and cab, showing the manner in which they intersect;

Fig. 7 is a cross-sectional view along the line 7—7 of Fig. 2, showing the sides of the passageway folded down out of position;

Fig. 8 is an enlarged side view of the diaphragm and coupling; and

Fig. 9 is a fragmentary enlarged view of the clamping member for the doors.

Figure 5:
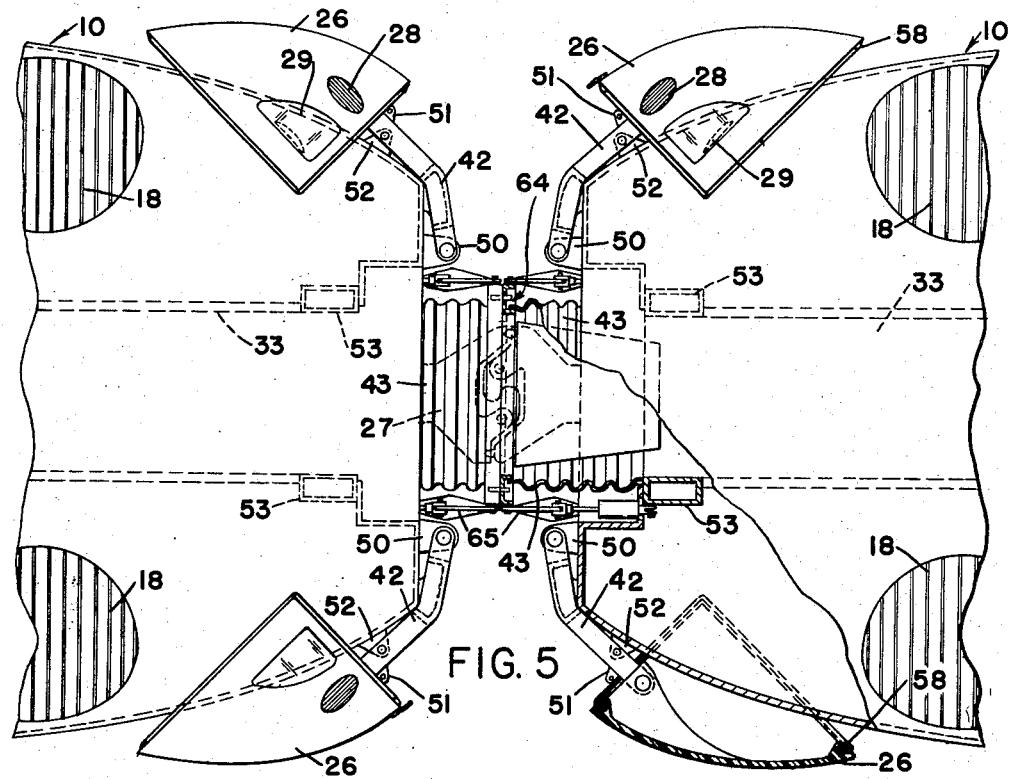
Fig. 5 is an enlarged fragmentary view of the coupling, diaphragm and clam shell doors.

In the drawings, 10 indicates a motor train unit generally, and 11 indicates the cab structure for the motor train unit. 12 indicates generally a truck for the motor train unit. In connection with the train, there are a number of crew doors indicated at 13 and 14. A stack for the engine exhaust is shown at 15, and ventilating louvres for the engine are shown at 16. Another ventilator is shown at 17.

In the front part of the motor train unit would be additional ventilators 18 and 19 for the auxiliary engine that provides train services, such as lighting, air conditioning, power for cooking, etc.

In connection with the cab, shown generally at 11, would be a number of window units 20, a sliding panel window unit 21, marker lights 22, and shown in dotted lines is a pedestal chair 23 within the general confines of a cab 11. Stairs leading to the cab are shown at 25.

In connection with the front of the engine, there would be a pair of clam shell doors 26, a car coupler 27 within the streamlining for the clam shell doors, horns 28 and headlights 29. A pilot is shown at 30.

Further in connection with Fig. 2, a pair of auxiliary engines is shown at 31 and 32, and these would comprise diesel engines, generators and possibly certain components of the air conditioning equipment. A passageway is shown at 33 which would be centrally located through the motor train power unit.

The operating cab is shown at 24 having a front portion 35 and a rear wall 34, with seats 23 which are mounted on either side of the passageway. A raised floor of the cab is ahead of the low wall 36. The diagrammatic structure of the passageway tunnel will be shown in connection with Fig. 7. The insulated passageway wall is shown at 77, providing heavy insulation to keep down the noise of the mechanical components from the passageway. A plurality of insulated doors, one of which 14 is a crew door, and other doors shown at 37 provide insulated doors onto the passageway. Another door is shown at 38 which could block the passageway when the train is running alone to prevent accidental entrance into the crew quarters and the cab by the passengers. The main propulsion engines are shown at 39 and another door at 40. Additional doors for the crew and passengers are shown at 13.

Fig. 3 shows a view of two of the motor train units coupled together, and the passageway is shown in dotted lines and extends centrally of the train between the power units. An angulated or bent arm 42 is pivotally mounted to the motor train unit, and coupled together as will be more fully described later. The rubber diaphragm is shown generally at 43. The remaining components of the other motor train units are substantially identical.

Fig. 4 shows the cut-away view of the interior of the cab, showing the stairway leading up to the cab, with the pedestal chairs and the passageway. One of the pedestal chairs is shown at 23, having a pedestal 44. The passageway is the full height, possibly 6½ feet to 7½ feet in height, and particularly in low height trains the cab would have to have a minimum height of 5 feet to 6 feet. It will be seen that there will be insufficient height for the full cab and the full passageway, and it is desirable to provide a cab that extends the full width of the motor train power unit and having seats on both sides for visibility and control purposes. It is also desirable to have easy and quick access across the cab and if the passageway must, of necessity, intersect the cab, then when a number of motor train units are coupled together, it is also desirable to have access through the cab. However, the cab in the interior of coupled cars would not be employed and would be unoccupied and operated from the front cab. Under these circumstances, it would not be necessary to have the access readily across the cab and, in fact, the cabs would be unoccupied, in general. Consequently, there are provided passageway sides which are shown at 45 generally, and these would be composed of side members pivoted; one of the sides is shown at 46, the top portion is shown at 47 and the right side portion is shown at 48. 48 and 47 side members are pivoted together and fold down, and member 46 folds on top of said members. This combination of a passageway and cab member provides a convenient way for a full height passageway centrally of the motor train unit, with a cab structure which is across the full width of the motor train unit, when in operation.

Figs. 5, 6, 8 and 9 are directed to the car coupling system, clam shell doors, locking means and the diaphragm structure between the motor train units.

In connection with Fig. 5, an arm 42 is pivoted to a bracket 50, which is fixed to the motor train unit. The arm has a further bracket 51 for coupling the members together, and another bracket 52 is attached to the outside of the motor train unit to permit coupling when in the open position. A structural member connecting the collision posts 53 is shown at 78. In diagrammatic form is shown the coupler which may be of any of a variety of structures, but need not necessarily be a retractable or drop coupler as it fits within the confines of the door structures. The clam shell doors could well be of reinforced fiberglass or of other material, and are adapted to seal water tight when in closed position. The coupling means is shown at 27. Details of the diaphragm, shown generally at 43, can be seen in connection with Fig. 8. Briefly, before getting to Fig. 8, Fig. 7 shows a cross-sectional view along the line 7—7 of Fig. 2. This shows the passageway and shows the doors in the folded position. That is to say, the passageway in this position would be interrupted and would not be the full height. The top shown at 47 is pivoted in the downward position and is folded into the horizontal with member 45. Then following this, the left side member 46 is folded on top of the doors 47 and 48. All of said doors shown generally at 45 are then in close compact relationship which may be tighter than the relationship shown herein, as this is general and diagrammatic. Other means for providing an intersection of a full width cab structure with a longitudinal pasage may be employed, employing comparable structures to that shown herein. Support means shown at 55 may be employed to provide rests for the cab components 45, 46, 47 and 48.

Figure 6:
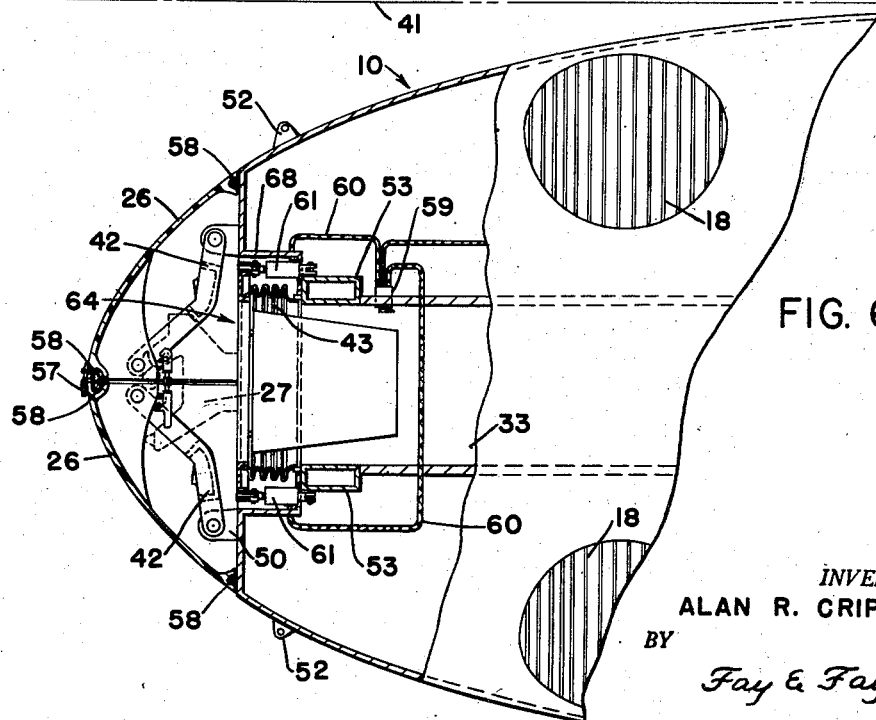
Fig. 6 is a fragmentary enlarged end view of the diaphragm doors and associated equipment.

In connection with Fig. 6, a lock or finger is shown at 57 to hold the doors together. Appropriate sealing means is shown generally at 58 to make an air and water tight seal. The bracket member to the motor train power unit is shown at 50. The arm 42 is shown folded around and adjacent to the oppositely disposed arms. The coupler 27 is shown in phantom, and it will be noted that it is within the confines of the door, so it is not necessary to have a drop or retractable coupler, which is a more complex mechanism.

Other details of the units will be seen in connection with the other views, and the detailed description of the toggle clamp locking means can be seen in connection with Fig. 9. The diaphragm structure is shown retracted at 43, and a valve control means is shown at 59. Suitable connections are shown at 60, and an operating air cylinder is shown at 61. This is adapted to cause the return of the rubber diaphragm structure to its support means.

In Figs. 6 and 8 we see the pilot 30 and a gusset or supporting bracket 63. In detail the other features of the diaphragm structure, shown generally at 43, follow. The diaphragm would be a rubber diaphragm or equivalent means with a series of supports. The outside would be a rigid support shown generally at 64, having a diagonal support strut 65 attached as by means of a pin 66. The air cylinder 61 would be connected to the operating rod 67 and attached centrally of the diaphragm structure, in order to return the diaphragm structure within the motor train power unit. Generally the weight of the diaphragm will carry it outwardly, and air would be used to return it within the power unit. The diaphragm fits within a housing member 68 of the power unit. The coupler is shown generally at 27 and may be one of a number of coupling types, and suitable connections for service lines are shown at 69. The longitudinal members supporting the car and able to take the buff load are shown generally at 70.

Fig. 9 shows in detail the connections between the doors 26. The arms 42 are shown in position, and one of said arms has brackets as at 51 extending on the internal side of the door, a pivot pin 73 in said bracket and a link 74. A screw type toggle arrangement is employed having a hook element 75, a threaded member within said hook element 76 and an L-shaped member threaded internally to accept member 76, and having a portion extending around the pivot pin 73 and link 74 and pivotally connected therewith. The threads are, of course, threaded in opposite directions so that a tight connection can be provided by means of the hook element to hold the door securely together. It will be further noted that the nature of the supporting arms will provide a tight connection against the elements by means of this combination.

From the foregoing it will be seen that the motor train unit may be operated singularly, and the clam shell doors will be locked together, the diaphragm retracted as by means of the air cylinder 61, and the clamping means for the arms of the clam shell door 26 will be tightly closed, as is seen in connection with Figs. 6 and 9.

Similarly, in this position the passageway sides are shown generally at 45 and will be in the position as shown in Fig. 7. That is to say, the passageway will be partially blocked, but the motor train unit doors will be closed in any event. This provides operation from the cab 24.

When it is desired to couple two or more trains together, as is shown in connection with Fig. 3, the clam shell doors will be open, the clamps removed, pins will be inserted to hold the doors 26 within the area of skin drag, the diaphragm 43 will be permitted to extend outwardly by the weight of the unit, suitable clamping means not shown will attach the diaphragms together, and the cars will be coupled, and the coupler 27 will provide a connection between trains. Service connections 69 may be made.

In this position, the cab will have the doors 45 as shown in connection with Fig. 4, and though the cab is usable, movement is impeded across the full width of the cab.

The doors may be moved as shown in connection with Fig. 2 to provide an insulated passageway. Sound from the main driving engines 39 and the auxiliary engines 31 would be reduced because of the insulated doors and passageway. The complete installation will permit movement of the crew and passengers between the trains down the insulated passageway.

Although the present invention has been described in connection with the preferred embodiments thereof, variations and modifications may be resorted to by those skilled in the art without departing from the principles of the invention. All of these variations and modifications are considered to be within the true spirit and scope of the present invention as disclosed in the foregoing description and defined by the appended claims.

I claim:

1. In a motor train power unit, cab and passageway, a power unit having a passageway through the length of said unit, a pair of doors at the front end of said unit, coupling and diaphragm means for connection with another motor train unit to provide a passageway therethrough, a cab in said unit extending across the full width of the motor train power unit, said cab and said passageway intersecting through a substantial portion of the cab, a pair of folding sides of the passageway adapted to project into said cab and to fold down into the passageway whereby a full height passageway may be provided through the cab when multiple motor train unit operation is desired, and a full width cab without a passageway projecting into said cab may be provided during single operation.

2. In a motor train cab adapted for multiple unit operation and providing a passageway through the motor train power unit, a cab across the entire width of said power unit, said cab having a domed portion projecting above the level of the train with visibility in all directions, said cab being provided with control facilities, the floor of said cab projecting across the entire width of the cab without having a major projection or tunnel into said cab, a passageway through the length of the motor train power unit, said passageway being of full height adapted to pass a person walking therethrough, said passageway intersecting said cab through a substantial portion, said passageway having side walls and a ceiling adapted to fold down into the floor of said cab and fold up into the cab when said cab is not in operation to provide a full height passageway through the motor train power unit.

3. A motor train power unit of claim 2 in which there are provided a plurality of seats, one on either side of the cab, and an open section therebetween into which a portion of the sides and ceiling of the passageway are adapted to collapse to provide a full width cab.

4. In a low height motor train power unit, a cab projecting in a dome with visibility in all directions, control facilities in said cab, a plurality of seats, one on either side of said cab, said cab projecting across the entire width of the power unit, a passageway through said train and intersecting said cab to permit passengers walking through the power unit during multiple unit operation, coupling and diaphragm means on the end of the power unit for said power unit and passageway, said passageway having on the upper portion thereof where it intersects the cab a plurality of folding doors, the ceiling of said passageway being hinged to the side and adapted to fold to the horizontal position, the opposite side door adapted to fold over said side door so that the passageway does not intersect the cab when the cab is in operation, whereby multiple unit train operation is permitted with a cab having no interruption or tunnel therein when the train is being operated singularly, and a passageway through the entire train is provided during multiple unit operation when the motor trains are being run in tandem.

5. A motor train power unit having a cab with good visibility, a passageway through the entire train, and means for connecting the passageway to another motor train unit, including the coupling means and diaphragm therefor, said connection, including the coupling and passageway and including a streamlined appearance with a pair of clam shell doors, adapted to pivot substantially in the vertical plane, said pivots including a pair of arms attached to said streamlined doors to move the doors outwardly but not in the area of skin drag, a diaphragm structure within said clam shell doors adapted to move forward and make connection with the corresponding diaphragm of another motor train unit, a coupling means within the outline of said doors adapted to couple with another motor train unit, whereby a complete coupling may be made preserving the streamlined appearance of the motor train unit when operated singularly, and providing permanent doors which will not affect the skin drag, and providing for a fixed coupling that is within said motor train unit.

6. The motor train power unit connecting means of claim 5 in which the diaphragm structure includes a multiplicity of concentric members and a diaphragm structure therefor, with an end frame structure which is supported at the upper portion, an angular support arm connected to the upper portion of the end frame structure, a lower support bracket for said angular support arm, said support bracket being connected to the motor train unit, power means between a central point of said angular support arm and the power unit to cause movement in said diaphragm.

References Cited in the file of this patent

UNITED STATES PATENTS

| | | |
|---|---|---|
| 2,062,560 | Decker | Dec. 1, 1936 |
| 2,090,492 | Udstad | Aug. 17, 1937 |
| 2,093,535 | Adams et al. | Sept. 21, 1937 |
| 2,642,816 | Sbrighi | June 23, 1953 |
| 2,662,488 | Clary | Dec. 15, 1953 |